(12) United States Patent
Rosenbalm et al.

(10) Patent No.: US 9,485,913 B2
(45) Date of Patent: Nov. 8, 2016

(54) CONVERGING DRUM AND STRIPPER ARRANGEMENT

(71) Applicant: DEERE & COMPANY, Moline, IL (US)

(72) Inventors: Allan W. Rosenbalm, Blakesburg, IA (US); Roger D. Stephenson, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 45 days.

(21) Appl. No.: 14/185,763

(22) Filed: Feb. 20, 2014

(65) Prior Publication Data

US 2015/0230405 A1    Aug. 20, 2015

(51) Int. Cl.
  *A01D 43/00*    (2006.01)
  *A01D 57/00*    (2006.01)
  *A01D 34/66*    (2006.01)
  *A01D 57/30*    (2006.01)

(52) U.S. Cl.
  CPC ............ *A01D 57/00* (2013.01); *A01D 34/667* (2013.01); *A01D 57/30* (2013.01)

(58) Field of Classification Search
  CPC .................................................... A01D 34/667
  USPC ................. 56/6, 13.9, 16.4 R, 153, 157, 192
  See application file for complete search history.

(56) References Cited

U.S. PATENT DOCUMENTS

| 5,272,859 A | * | 12/1993 | Pruitt et al. ..................... 56/15.2 |
| 5,430,997 A | * | 7/1995 | O'Halloran et al. ............... 56/6 |
| 5,433,064 A | * | 7/1995 | Schmitt et al. ...................... 56/6 |
| 5,463,852 A | * | 11/1995 | O'Halloran et al. ............... 56/6 |
| 5,768,865 A | * | 6/1998 | Rosenbalm et al. ................ 56/6 |
| 5,842,330 A | | 12/1998 | Richardson et al. |
| 6,158,201 A | * | 12/2000 | Pruitt et al. ......................... 56/6 |
| 6,581,362 B2 | | 6/2003 | Rosenbalm et al. |
| 7,165,381 B2 | | 1/2007 | Rosenbalm et al. |
| 7,726,108 B1 | * | 6/2010 | Pruitt et al. ..................... 56/14.5 |
| 8,291,685 B2 | * | 10/2012 | Pruit et al. ..................... 56/157 |
| 2008/0066439 A1 | * | 3/2008 | Barnett ............................. 56/7 |

FOREIGN PATENT DOCUMENTS

EP    1306003 A1    5/2003

OTHER PUBLICATIONS

John Deere, Hay Tools Brochure Nov. 2010.

(Continued)

*Primary Examiner* — Thomas B Will
*Assistant Examiner* — Mai Nguyen (57) ABSTRACT

A mowing implement includes an improved crop and forage material converging arrangement for a wide mowing implement equipped with a rotary cutter bar and powered converging drums. One or more stripper elements are mounted for rotation with one or more converging drums so as to limit the tendency for cut material to wrap around the converging drums, and to more consistently transfer the cut material to the material discharge zone. Each stripper element can be located and dimensioned to sweep a path a near an adjacent converging drum and pass in close proximity to an auger of the mowing implement to effectively guide and converge material. Each stripper elements can be an oblong plate configured and arranged to strip cut material from an adjacent converging drum and deflect the stripped material towards a material discharge zone of the implement.

13 Claims, 9 Drawing Sheets

(56) References Cited

OTHER PUBLICATIONS

Elho, Mower Conditioners and Disc Mowers Brochure, Oct. 2013.
Picture of Elho Cutting Disc Platform, Nov. 13, 2013.
Hesston Massey Ferguson, 1300 & 1400 Series Mowers and Mower Conditioners Brochure, 2011.
Pictures of Hesston Massey Ferguson Cutting Disc Platform, Feb. 2, 2009 & Jun. 20, 2011, respectively.
MacDon, Self-Propelled Windrowers and Headers Brochure, Dec. 2012.
Picture of McDon Cutting Disc Platform, May 2011.
Kemper, 300 Series Header Brochure, Admitted Prior Art.
Kemper, 300 Plus Series Header Brochure, Admitted Prior Art.
Kemper, 400 Series Header, Admitted Prior Art.
John Deere, Mower-Conditioners and Mowers Brochure, Feb. 2013.

* cited by examiner

CONVERGING DRUM AND STRIPPER ARRANGEMENT

CROSS-REFERENCE TO RELATED APPLICATION(S)

Not Applicable.

STATEMENT REGARDING FEDERALLY SPONSORED RESEARCH

Not Applicable.

FIELD OF THE DISCLOSURE

This disclosure relates to an improved crop and forage material converging arrangement, and more particularly to cut material converging arrangement including a converging drum with an attached stripper element.

BACKGROUND OF THE DISCLOSURE

The width of crop and forage mowing machines, such as mower-conditioners, self-propelled windrowers, and the like have been increasing in order to form sufficiently large windrows of crop to meet the capacity of modern balers and forage harvesters. These wider mowing machines have presented the challenge to designers of how to converge the mowed crop. One solution is to provide a rotary cutter bar where the outer two or more cutting disks rotate toward the center of the platform to help converge crop into the conditioner opening. Another solution applied to platforms having such rotary cutter bars, for example, is to provide powered crop converging drums either suspended above or mounted directly to one or more of the rotary cutting units disposed along the length of the cutter bar. It is desired that the crop move along in front of the adjacent drums and above the disks as it is moved toward the conditioner opening.

Some such prior art platforms have the disadvantage that crop can get forced underneath suspended converging drums when crop is converging to the discharge zone where the conditioner is located. When crop gets trapped under one or more of the converging drums, further crop can be carried around to the rear of the drum(s) and get trapped between the drum(s) and the bulkhead of the platform. The trapped crop can cause plugging of the drum(s), i.e., the crop can wedge so tight that the drum(s) are prevented from rotating. This can result in the failure of components of the powered drum drive system.

Another drawback of some prior art platform is that crop, particularly that carried by the first cutter disc directly in front of the discharge zone defined between opposite inner side walls to which the conditioner is mounted, will sometimes hairpin on the fronts of these inner side walls. This crop build-up can grow in size until it interferes with crop flow or causes plugging of the converging drums.

To address the drawbacks of the aforementioned converging arrangements, it is known in the art to provide an ejector plate mounted directly to one of the rotary cutting units on the cutter bar to mitigate crop build-up, wrapping and hairpinning. It is also known to use such an ejector plate in combination with a converging drum mounted to the cutting disk on the cutter bar. However, one drawback of such converging arrangements utilizing ejector plates mounted to the cutter bar is that crop build-up, wrapping and hairpinning may not be adequately prevented—especially for more challenging crop and forage processing operations, because the cut material is not sufficiently transferred to the discharge zone.

SUMMARY OF THE DISCLOSURE

According to the present disclosure, there is provided an improved crop and forage material converging arrangement, such as for a wide mowing implement equipped with a rotary cutter bar and powered converging drums. The disclosure provides at least one suspended converging drum provided with at least one stripper element. The converging drum and stripper element arrangement can limit the tendency for cut material to wrap around the converging drums, and to more easily release the cut material. A suspended converging drum and stripper element arrangement can be configured so as to strip cut material from adjacent converging drums and deflect the stripped material towards a material discharge zone of the implement. The disclosure also provides for mounting one or more stripper elements for rotation with one or more associated suspended converging drums. One or more of the stripper elements can thus be arranged to sweep beneath at least one of the converging drums to move cut material from beneath it. As the stripper element rotates with the converging drum, the stripper element is positioned at a height and a position relative to an auger associated with the material converging arrangement to guide material into the conditioner. In still another aspect of the disclosure, one or more stripper elements can be mounted at varying positions along an upright axis of a converging drum. In one example, stripper elements can be mounted on adjacent converging drums such that rotation of the adjacent converging drums causes the paths of stripper elements on adjacent converging drums to overlap.

Thus, in one aspect the disclosure provides a mowing implement for cutting crop and forage material above the ground. The implement can include a frame defining a work area between the frame and the ground in which a material discharge zone is located. A cutter bar can be supported by the frame and have spaced apart knife-carrying rotary discs disposed in the work area. At least one converging drum can be mounted to the frame about an upright axis and suspended above and spaced from the cutter bar. At least one stripper element can be mounted to the converging drum(s) to rotate about the upright axis and be configured to transfer cut material from at least one of the rotary discs to the material discharge zone.

In another aspect the disclosure provides a mowing implement having a frame, cutter bar and a converging drum assembly supported between the frame and the cutter bar. The converging drum assembly can include: a first converging drum corresponding to an outer first one of the rotary discs; a second converging drum corresponding to a relatively inner second one of the rotary discs and located laterally inside of the first converging drum, and rotatable about an upright axis and suspended above and spaced from the cutter bar; and an intermediate converging drum arranged between the first and second converging drums. At least one stripper element can be mounted to the second converging drum to rotate about the upright axis of rotation and transfer cut material from the first rotary disc to the material discharge zone.

In yet another aspect the disclosure provides a mowing implement having a frame with side walls to which a cutter bar is mounted and between which first and second conditioner rolls and an auger are rotatably supported. The rollers are in spaced relation from one another to define a material discharge zone. The auger is arranged proximate the material discharge zone. The cutter bar is mounted below the auger and rollers and at least one converging drum can be suspended from the frame above the cutter bar about an upright axis of rotation. At least one stripper element can be mounted to the converging drum(s) to rotate about the upright axis and transfer cut material from at least one of the rotary discs to the material discharge zone.

These and other aspects and advantages of the cut material converging arrangement disclosed herein will become better understood upon consideration of the detailed description of the drawings.

BRIEF DESCRIPTION OF THE DRAWINGS

Like reference numerals will be used to refer to like parts from figure to figure in the following detailed description.

DETAILED DESCRIPTION

As also discussed above, in various situations it may be useful to provide a suitable arrangement to converge material toward a desired location. For example, it may be useful to process wide sections of material such as crops, grasses, forage and the like with cutting equipment for the purposes of efficiency and to meet the capacity of modern balers and forage harvesters. In order to accommodate wider sections of material in a single pass, mower-conditioners, self-propelled windrowers, and the like may be provided with wider cutter bars or other enlarged features. One approach to effectively converge crop into the conditioner opening on a greater scale relies upon powered crop converging drums that rotate proximal to the cutter bar to move crop toward the conditioner opening. However, even with crop converging drums it may still be difficult to effectively guide cut crop. For example, the cut crop can become trapped under, behind and/or between the converging drums, which can result in a blockage that prevents crop from converging toward the conditioner opening. Moreover, the use of ejector plates mounted to cutting units disposed on the cutter bar individually or in combination with mounted or suspended converging drums may not adequately mitigate such blockages. Various other problems may also arise as the scale of the crop cutting equipment is increased.

Use of the disclosed stripper element may address these and other issues. For example, for crop cutting equipment including a cutter bar with at least one converging drum suspended above the cutter bar, a stripper element is coupled for rotation with the suspended converging drum. The stripper element can be shaped to guide crop along various paths and to prevent blockages caused by cut crop accumulating under, behind and/or between the converging drums. As such, suitable shapes will guide crop present in the vicinity of the converging drum toward the crop conditioner opening. In one example embodiment, the stripper element is an oblong, flat plate with a curved periphery and is attached to a bottom face of the suspended converging drum. As such the stripper element is disposed between the cutter bar and converging drum. Moreover, a portion of the stripper element can project laterally outward from beneath the converging drum to sweep a path beneath an adjacent converging drum. Such projections can strip cut crop from the adjacent drum, thereby preventing blockages, hairpins, and the like. Additionally (or alternatively), the stripper element is positioned at a location in close proximity to an auger to pass or guide material to the auger.

One aspect of an example stripper element according to the present disclosure is that the stripper element is mounted to the base of a suspended converging drum as opposed to being mounted to a cutting unit disposed on a cutter bar. Empirical testing has shown that suspending the stripper element above the cutter bar and in close proximity to an auger leads to improvements in the effectiveness of material converging operations. In another aspect, providing stripper element at a location to sweep a path under an adjacent suspended converging drum was shown to lead to improve converging and ameliorate material blockages. In addition, mounting the stripper element to the suspended converging drum, among other advantages, allows for the stripper element to be rotated in a different direction and at a different speed with respect to a cutting unit disposed on the rotary cutter bar.

A stripper element according to the present disclosure can be configured in any suitable shape and size to effectively converge a particular crop, grass or other material. For example, it can be desirable to have a larger or smaller stripper element, or a stripper element with more or less than two projections when processing a material with a given set of characteristics. Similarly, in various embodiments, a stripper element can be utilized with an arrangement including any number of converging drums. Accordingly, for an arrangement of three or more converging drums, a stripper element can be mounted to a first (outer) converging drum, a second (inner) converging drum or an intermediated converging drum.

Multiple stripper elements can also be utilized. One or more stripper elements can be mounted to a single converging drum. For example, two or more stripper elements can be mounted to a converging drum at different elevations along an upright axis of the converging drum. As one example, one stripper element can be mounted at a bottom end of the converging drum, and a second stripper element can be mounted at an intermediate location between the top and bottom ends of the converging drum. Alternatively or in addition, multiple stripper elements can be mounted to multiple converging drums such that each converging drum mounts one or more stripper elements. For example, stripper elements can be mounted on adjacent converging drums such that at least one of the stripper elements of one converging drum overlaps either the adjacent converging drum or one or more of the stripper elements on the adjacent converging drum. Further, the multiple stripper elements can be the same or different configurations and sizes. For example, a larger stripper element can be used to sweep beneath an adjacent converging drum, while relatively smaller stripper elements on adjacent converging drum can pass between the converging drums.

The one or more stripper elements disclosed are shown and described as being fixedly mounted to the associated converging drum, and thus caused to rotate or not rotate with the converging drum. However, the stripper elements can be arranged to rotate independently of the converging drum to which it is mounted. It will also be appreciated that embodiments of crop cutting equipment in which a converging drum arrangement is omitted may still have stripper elements that are independently mounted.

Although various examples herein may discuss the use of a stripper element with respect to a mowing operation, it will be understood that the principles of a stripper element may be usefully applied to various other operations as well, including various other mowing, stripping and converging operations. Further, it will be understood that various equipment may be utilized with a stripper element other than the equipment presented in the examples herein, including for baling or other operations.

Preliminarily, it is to be noted that some parts are mentioned as occurring in pairs while only the left-hand or right-hand one of the pair is shown in the drawing, with it to be understood that the assembly being described is symmetrical about a vertical plane extending along a fore-and-aft centerline of the assembly.

Figure 1:
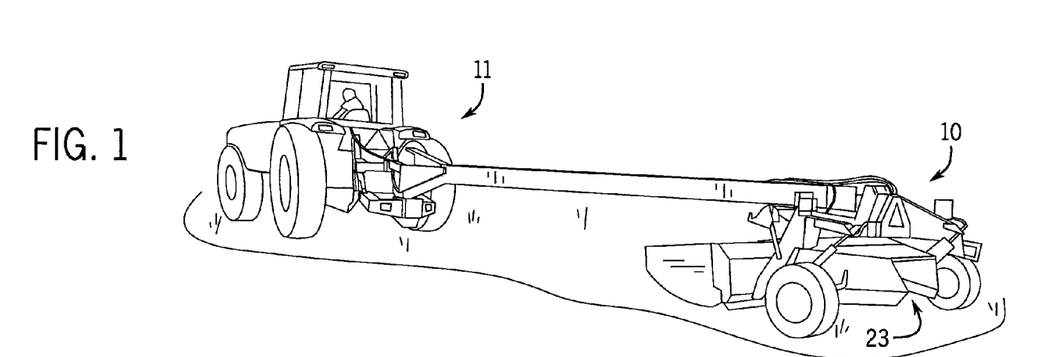
FIG. 1 is a rear perspective view showing an agricultural vehicle equipped with a mower-conditioner platform constructed in accordance with the present disclosure.
Figure 2:
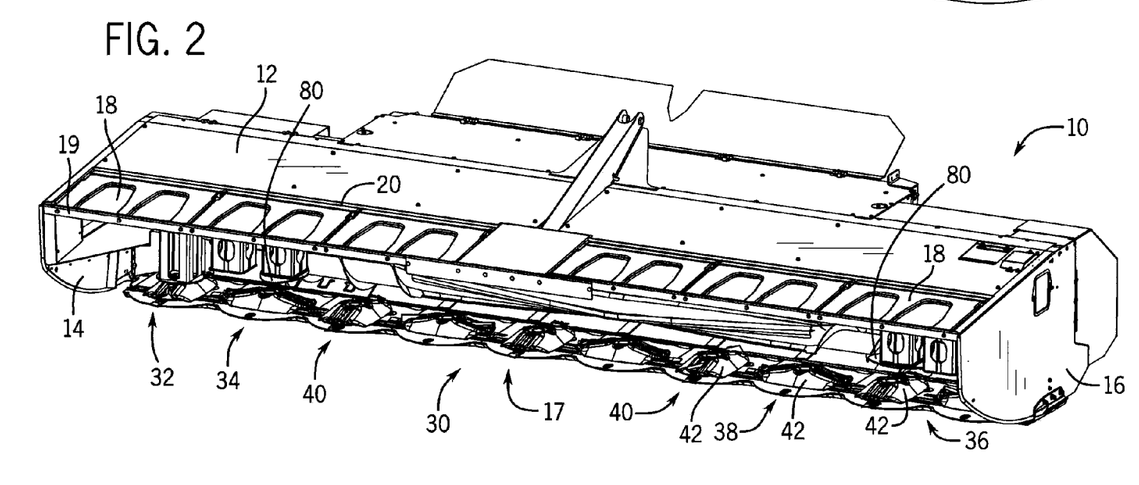
FIG. 2 is a front perspective view, with parts removed for clarity, of the mower-conditioner platform shown in FIG. 1.
Figure 3:
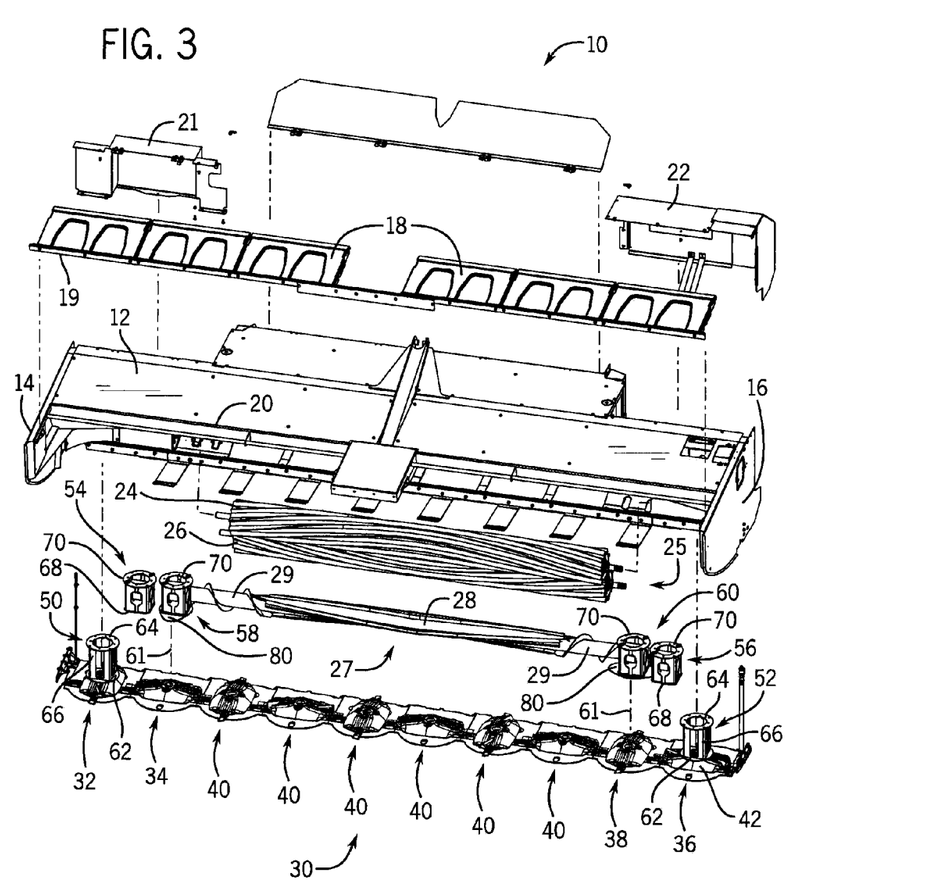
FIG. 3 is an exploded view of the mower-conditioner platform of FIG. 2.
Figure 4:
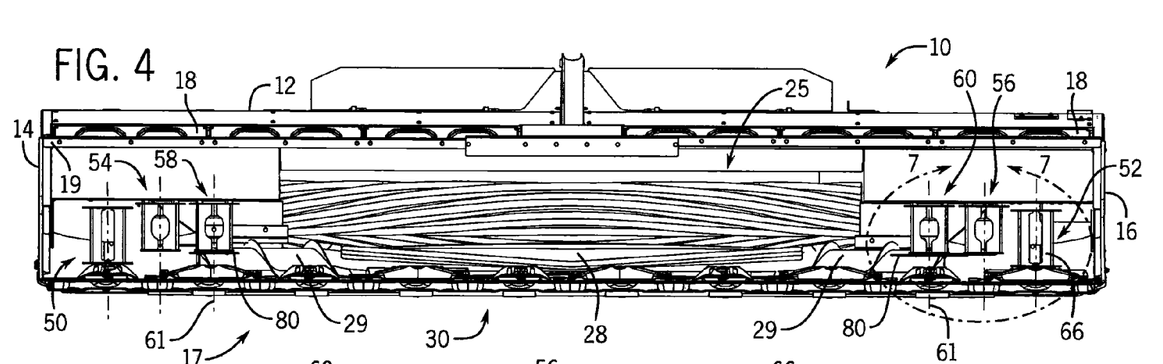
FIG. 4 is a front plan view of the mower-conditioner platform of FIG. 2.

Referring now to FIGS. 1 and 2, there is shown a mowing implement 10, here embodied as a mower-conditioner implement. FIG. 1 illustrates the mowing implement 10 being propelled by an agricultural vehicle 11. The mowing implement 10 can be either pushed or pulled by a vehicle 11 to mow and/or condition crops or grasses. Referring to FIGS. 2-4, the mowing implement 10 includes a top frame member 12 extending between right- and left-hand, outer side walls 14 and 16. A series of consecutive panels 18 also extend between right- and left-hand, outer side walls 14 and 16 along a front edge 20 of the top frame member 12. Together with the side walls, 14 and 16, the panels 18 generally define a forwardly located material inlet 17 proximal to a front edge 19 of the panels 18. Right- and left-hand upright transverse rear walls 21 and 22 extend inwardly from the side walls 14 and 16, respectively. The transverse rear walls 21 and 22 terminate approximately at the ends of a crop conditioner arrangement 25 having upper and lower conditioner rolls 24 and 26, which generally define the width of a material discharge zone 23 located centrally in the implement 10. It is to be understood that the location of the material inlet 17 and the material discharge zone 23 are not critical and that implements equipped with rotary disc cutter bars having material inlets and material discharge zones which are not centered relative to the cutter bar would benefit from the present invention. Moreover, various types of conditioner arrangements can be used in addition or alternately to roll conditioner arrangement 25. Such conditioners arrangements can include, but are not limited to flail/impeller conditioners, and the like.

The top frame member 12, together with side walls 14, 16 generally define a work area between the top frame member 12 and the ground. Material such as crops or grasses can generally enter the work area via the material inlet 17, be processed within the work area, and be discharged via the rearwardly located material discharge zone 23. Within the work area, each of the upper and lower conditioner rolls 24 and 26 of the conditioner arrangement 25 includes a central cylindrical drum to which is attached a plurality of axially extending ribs or flutes that mesh together for conditioning crop that passes between them. Note, however, that the terms "upper" and "lower" are used with respect to the particular embodiment shown in the Figures, and are not intended to be limiting of the disclosure. Similarly, other terms of position and location, such as "left", "right", "upright" and the like are also not intended to be limiting of the disclosure. The implement 10 includes a spring-loaded link assembly that yieldably resists upward movement of the upper conditioner roll 24 caused by crop passing between the conditioner rolls 24 and 26. The arrangement of gearing in the conditioner drive housing is such that the upper and lower conditioner rolls 24 and 26 are counter-rotated so as to draw crop in between them.

A rotatably mounted auger 27 extends between right- and left-hand side walls 14 and 16 passing in front the crop conditioner arrangement 25. In particular, the auger 27 is positioned in front of lower conditioner roll 26 with a central axis of the auger 27 laterally spaced apart from, and lower than a central axis of the lower conditioner roll 26. The auger 27 includes a central cylindrical drum with a central portion 28 and outer ends 29. The outer ends 29 of the auger 27 include flighting, and a plurality of fins is attached to the central portion 28. In operation, the design of the auger 27 enables the delivery of cut crop into a nip or gap area of the conditioner arrangement 25 with the auger 27 and lower conditioner roll 26 co-rotated (i.e., auger 27 and upper conditioner roll 24 are counter-rotated).

An elongate rotary disc cutter bar 30 extends between the outer side walls 14 and 16 so as to be just forward of the crop conditioner arrangement 25, in a perpendicular transverse relationship to a longitudinal center plane of the implement 10 extending along a path of travel of the platform during mowing operation. While the present disclosure could be advantageously applied to rotary cutter bars of various constructions, the cutter bar 30 is a known type containing a plurality of intermeshed spur gears including a plurality of idler gears meshed with each other and arranged in transverse alignment over the length of the cutter bar 30, with selected ones of the idler gears being meshed with drive gears respectively associated, one each, with a plurality of cutting units spaced along the cutter bar 30. For details of the gear housing and gearing of the cutter bar 30, reference may be had to U.S. Pat. No. 5,964,079, the entirety of which is incorporated by reference herein.

Respectively located inward of the right- and left-hand side walls 14 and 16, are right-hand outer and inner cutting units 32 and 34, respectively, and left-hand outer and inner cutting units 36 and 38, respectively. Located forward of the discharge passage, and hence, forward of the conditioner arrangement 25, is a plurality of central cutting units 40. The cutting units 32-40 each include a knife-carrying cutting disc 42 coupled to an upright drive shaft to which power is coupled for causing them to rotate in appropriate directions, as indicated by respective arrows, for delivering crop to the conditioner arrangement 25 extending across the discharge passage.

Figure 5:
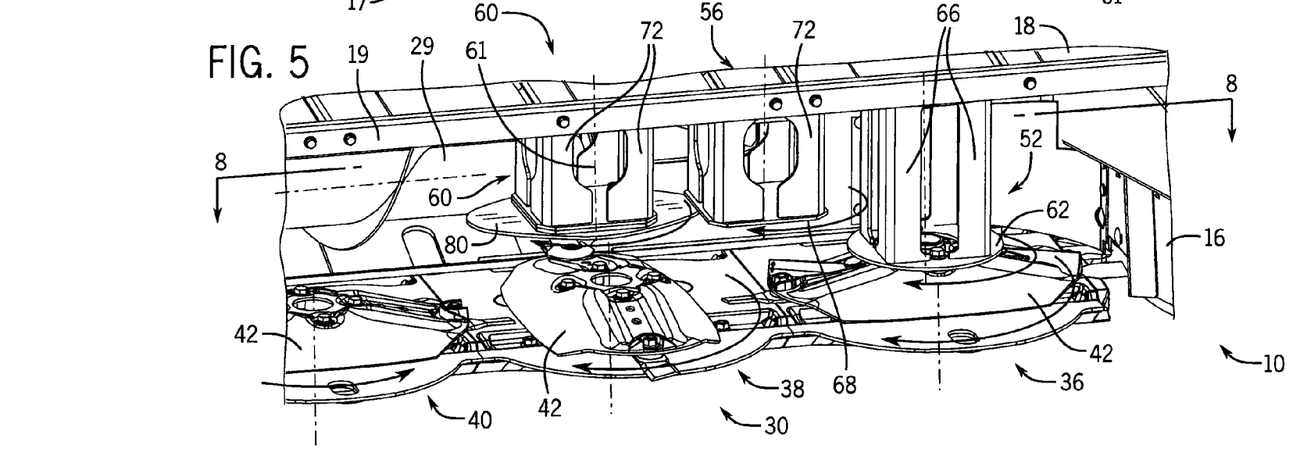
FIG. 5 is an enlarged partial front perspective view of the rotary cutter bar and converging drums of the mower-conditioner platform of FIG. 2.
Figure 6:
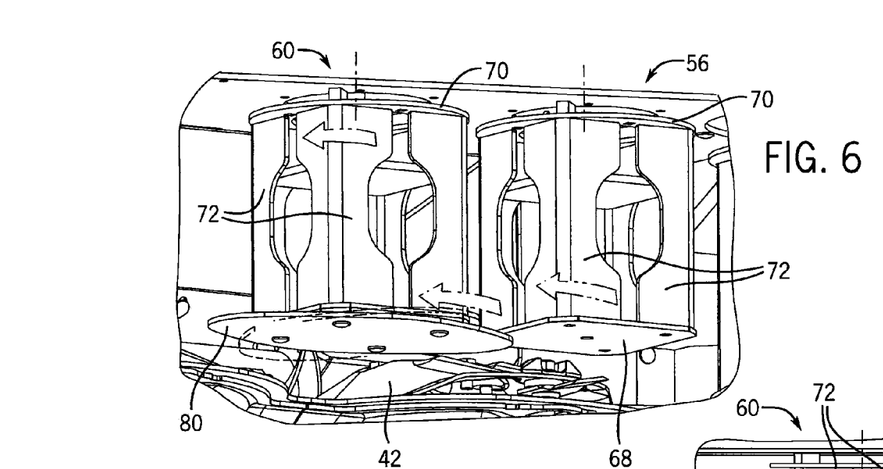
FIG. 6 is an enlarged partial front perspective view of the converging drums and stripper element of the mower-conditioner platform of FIG. 2.
Figure 7:
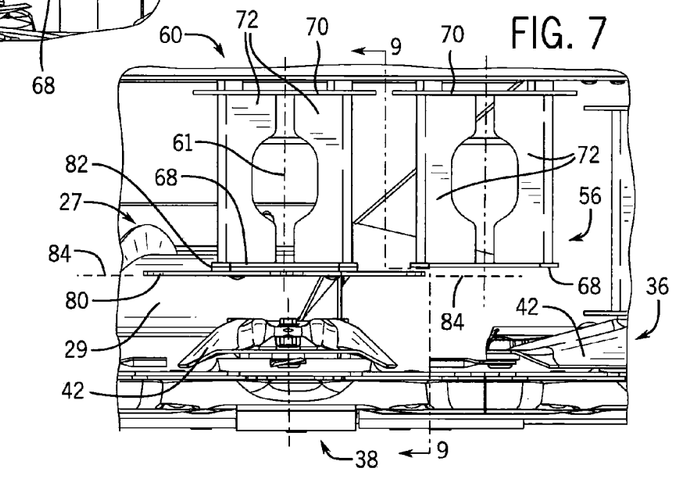
FIG. 7 is an enlarged front plan view of the converging drums and stripper element of the mower-conditioner of FIG. 2 as taken along arc 7-7 of FIG. 4.
Figure 8A:
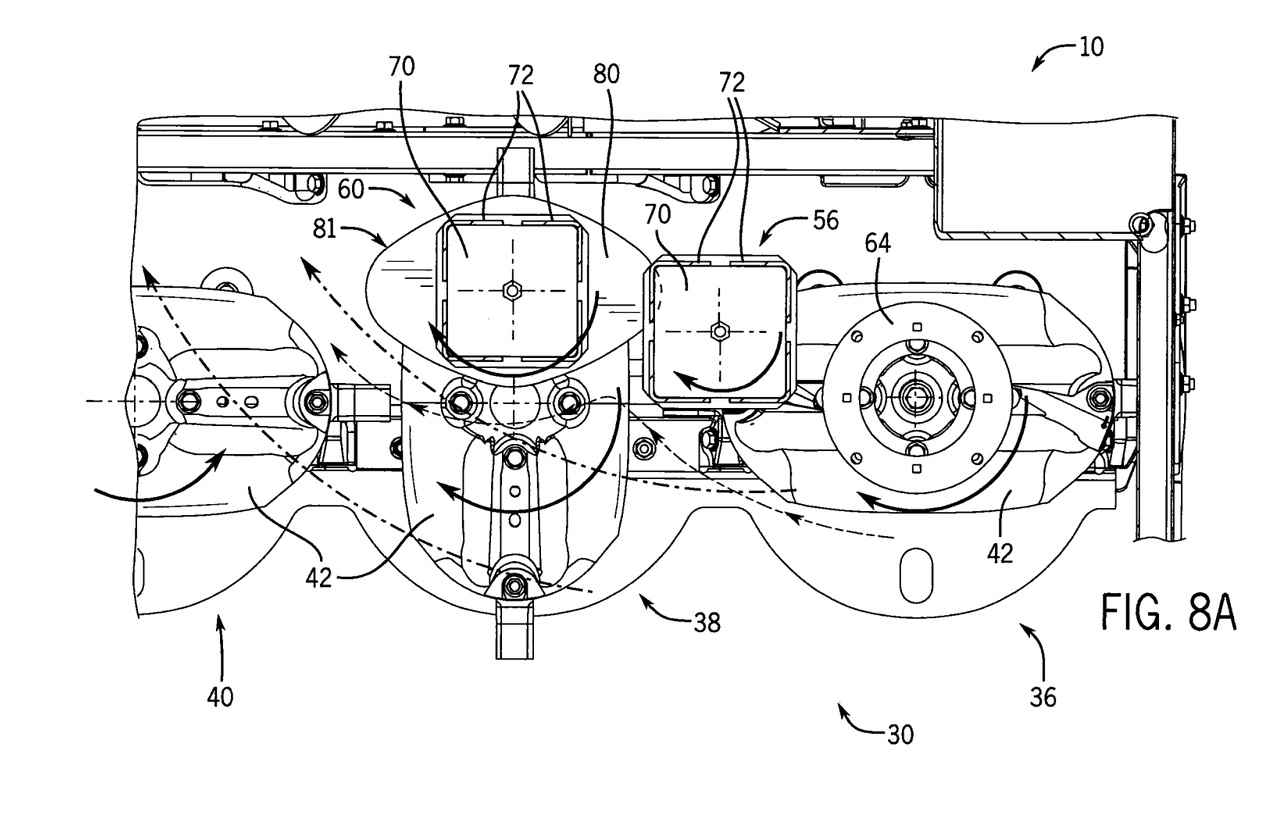
FIG. 8A is a partial cross-section view taken along line 8-8 of FIG. 5 showing the rotary cutter bar, converging drums and stripper element of the mower-conditioner of FIG. 2.

Provided for augmenting the rotating cutter discs 42 in conveying cut crop into the discharge passage for further processing by the conditioner rolls 24 and 26 are right- and left-hand converging drum sets, which respectively include first, outer or end converging drums 50 and 52, intermediate converging drums 54 and 56, and second or inner converging drums 58 and 60. The end converging drums 50 and 52 are respectively mounted on a generally upright axis 61 for rotation with the end cutting units 32 and 36. As can be seen in FIGS. 3-5, the intermediate converging drums 54 and 56 are set back from a line of centers passing through the centers of rotation of the cutting discs 42, and the inner converging drums 58 and 60 are set back relative to the intermediate converging drums 54 and 56 (FIG. 8).

It will be appreciated that the converging drums (i.e., 50, 52, 54, 56, 58, and 60) are mounted for rotation about a generally upright axis 61, in other embodiments, one or more of the converging drums can be mounted at varying angles. In addition, the direction of rotation can be varied to suitably converge material for a given arrangement. In one example, for a multiple converging drum arrangement, each of the converging drums can be independently rotated in either a clockwise or counterclockwise direction. The speed of rotation can also be varied such that, for example, the inner converging drums 58, 60 are rotated at a first speed (e.g., rpm), while the outer converging drums are rotated a second speed different from the first speed. Moreover, in some embodiments the converging drums can be fixedly mounted such that the fixed converging drums do not rotate during operation of the mowing implement 10.

A main power distribution gear box (not shown) is located above the left-hand end cutting unit 36 and is in communication with a gear coupled for rotating the end cutter disc 42. This gear is meshed for distributing power through a constant mesh gear train comprised of the idlers and further gears so that power is supplied for rotating the remaining cutter discs 42 of the cutter bar 30.

It is here noted that the sets of converging drums, and other crop converging structure at the opposite sides of the implement 10 operate the same in converging crop, and for the sake of brevity only the left-hand converging drums and other converging structure is described in detail.

Referring to FIGS. 5-9, detailed views of mowing implement 10 are provided. The left-hand end converging drum 52 is an open structure defined by lower and upper flat end discs 62 and 64, respectively, interconnected by four vertical angle members 66 located such that their respective corners are at the peripheries of the discs 62 and 64. The lower end disc 62 is fixed for rotation with the cutter disc 42 of the left-hand end cutting unit 36.

The intermediate and inner converging drums 56 and 60 are nearly identical, open structures, and each is defined by bottom and top end plates 68 and 70, respectively, joined by four vertical angle members 72. Specifically, the bottom and top end plates 68 and 70 are in the form of a flat plate with the top end plate 70 spaced vertically above the bottom end plate 68 and secured thereto by the four vertical angle members 72 arranged such that their respective corners are at the peripheries of the bottom and top end plates 68 and 72, respectively.

The intermediate and inner converging drums 56 and 60 are suspended above the cutting discs 42 with a vertical gap there between to allow the rotary disc cutter bar 30 to flex vertically. Some crop will pass beneath the bottom end plates 68, but is prevented from becoming packed under them partly due to the action of stripper element 80 that is mounted for rotation with the inner converging drum 60. The stripper element 80 is mounted at the base of the inner converging drum 60 at a vertical level such that it passes above the cutting discs 42 and below the intermediate converging drum 56 (FIGS. 5-8). In order to achieve the correct vertical spacing of the stripper element 80, a spacer plate 82 is mounted between stripper element 80 and the lower end plate 68 of the inner converging drum 60.

Figure 8B:
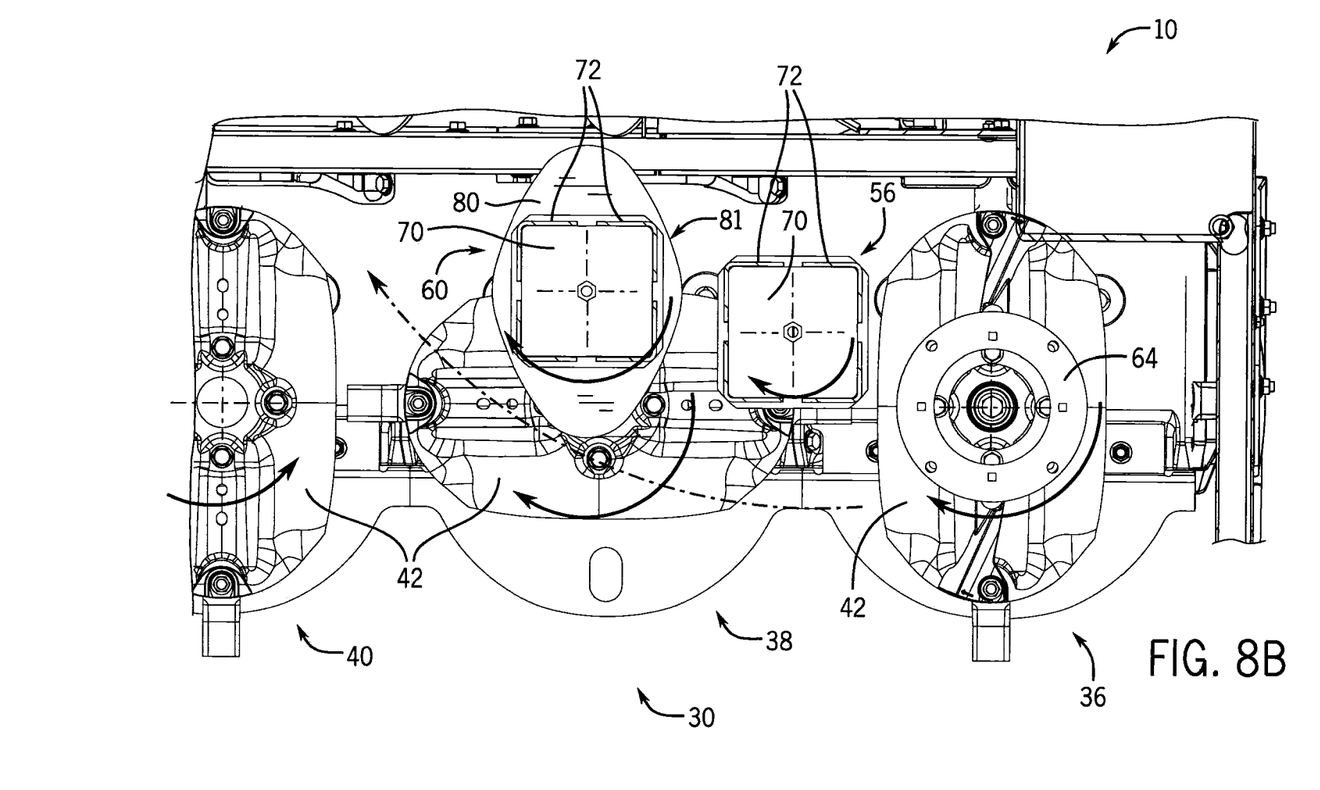
FIG. 8B is a partial cross-section view as in FIG. 8A in which the stripper element is rotated 90 degrees about an axis of rotation of the stripper element.
Figure 9:
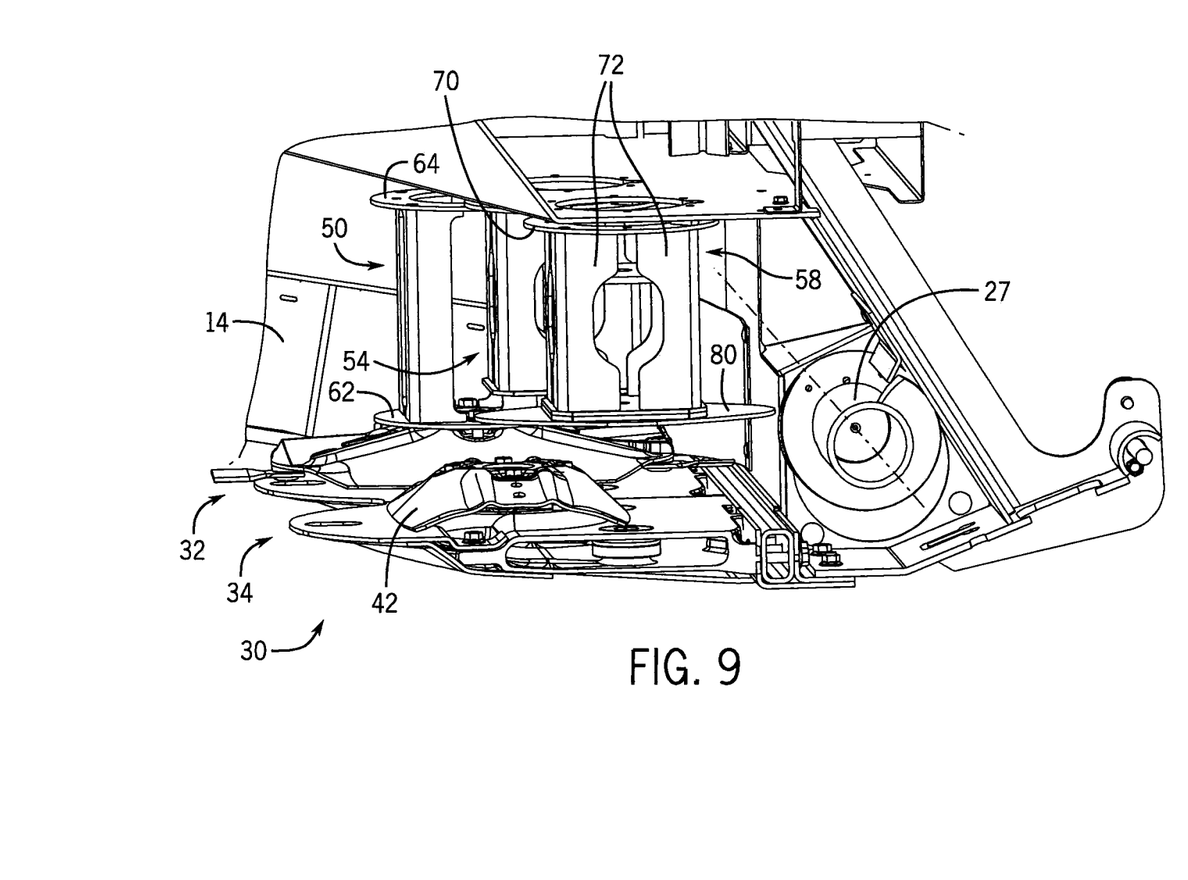
FIG. 9 is an enlarged partial side perspective view of the rotary cutter bar and converging drums of the mower-conditioner platform of FIG. 2.
Figure 10:
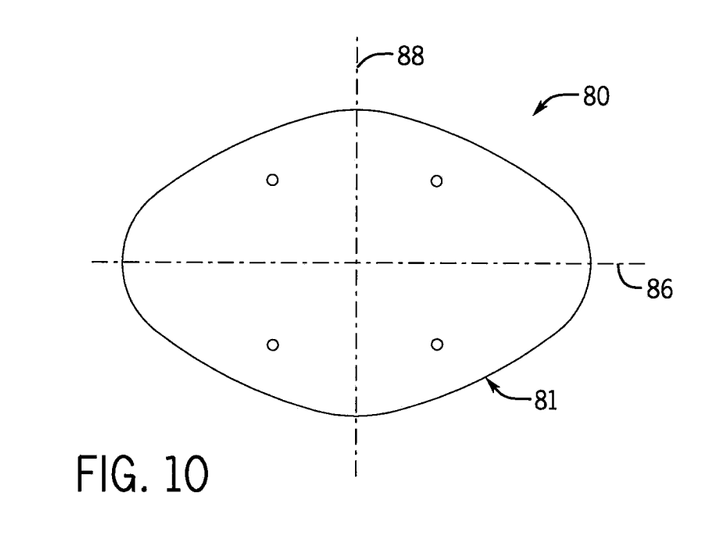
FIG. 10 is a plan view of the stripper element of FIG. 2 in isolation.

In the present embodiment illustrated at least in FIG. 10, one example of the stripper element 80 includes a flat, oblong shaped plate with a curved periphery or outer edge 81 and having a major axis 86 and a minor axis 88 that intersect. The stripper element 80 is symmetric about each of the axes and therefore has opposed rounded projections along the longer of the two axes. The stripper element 80 is coaxially mounted with the inner converging drum 60 such that centers of the two components are aligned as viewed in FIG. 8. The stripper element 80 is further sized such that portions of stripper element 80 extend or project outward from beneath the inner converging drum 60. FIG. 8 shows that portions of the outer edge 81 of the stripper element 80 along both the major axis 86 and the minor axis 88 extend outward from the inner converging drum 60. In the illustrated orientation, the major axis 86 of the stripper element is angled toward the intermediate converging drum 56 with the outer edge 81 of the stripper element 80 passing partially beneath the lower end of the intermediate converging drum 56. In the illustrated orientation, the degree of overlap of outer edge 81 of the stripper element 80 when positioned beneath the intermediate converging drum 56 is approximately 3.5 centimeters (about 1.4 inches). However, when the inner converging drum 60, and therefore the stripper element 80 is rotated 90° relative to FIG. 8, the stripper element 80 will no longer pass beneath the intermediate converging drum 56. Instead, the outer edge 81 of the stripper element will be positioned in closer proximity to auger 27.

In one aspect, an outer edge 81 of the stripper element 80 passes generally within about 1.6 centimeters (about 0.6 inches) of an outer circumference of the flighting on the auger 27. As illustrated at least in FIGS. 7, 8A, 8B and 9, a plane 84 defined by the stripper element 80 intersects a volume occupied by the auger 27. Generally, the stripper element 80, and the plane 84, can be positioned relatively higher or lower than the auger 27. For example, the plane 84 of the stripper element 80 can be positioned at an elevation above a centerline of the axis of rotation of the auger 27, such as about 25 mm (1 inch). The stripper element 80 can also be positioned so that it has similar vertical elevation relative to the ground as the auger 27. Alternatively, the plane 84 of the stripper element 80 can intersect the auger 27 at about a centerline of the axis of rotation of the auger 27.

With respect to the intermediate converging drum 56, the stripper element 80 is mounted in order to sweep a path beneath the intermediate converging drum 56. Therefore, the vertical height of the stripper element 80 can be varied to achieve the desired degree of clearance. In one aspect, the clearance between an outer edge 81 of the stripper element 80 when positioned beneath the intermediate converging drum 56 is less than about 0.6 centimeters (about 0.2 inches). It will be appreciated that in other embodiments, the relative height of the stripper element 80 can be varied by adjusting the width or number of spacer plates 82, the mounting location, height or dimension of the inner converging drum 60, or the mounting location, height or dimension of the intermediate converging drum 56.

The stripper element 80 is shaped to intercept crop being pushed rearward by the cutting discs 42 and intermediate converging drum 56 and move it instead toward the center of the implement 10 and back towards the auger 27 and conditioner arrangement 25 of the platform. The stripper element 80 can be configured and arranged such that the outer periphery passes beneath the intermediate converging drum 56 and in close proximity to the outer diameter of the auger when the converging drum 60 is rotated. The placement of the inner converging drum 60 and the shape of the stripper element 80 cooperate to allow the auger 27 to strip crop from the intermediate 56 and inner 60 converging drums. The placement of the intermediate 56 and inner 60 converging drums and the design of the stripper element 80 promote smooth crop flow from the outer cutting unit 36 to the auger 27 without wrapping on the intermediate and inner converging drums 56 and 60. Thus, in operation, the left-hand set of converging drums 52, 56 and 60 operate in conjunction with the cutting discs 42 to converge crop to the centrally positioned material discharge zone 23 where the conditioner assembly 25 is located.

With reference to FIG. 8, solid arrows are shown to indicate the direction of rotation of the converging drums, stripper element 80 and cutting discs 42, while dashed arrows are shown to indicate the flow of cut material as it converges toward a central portion of the crop conditioner arrangement 25. In the present embodiment, converging drums 53, 56 and 60 are shown to rotate in a clockwise direction as viewed from above. Similarly, outer and inner cutting unit 36 and 38 are shown to rotate in a clockwise direction. By contrast, at least one of the central cutting units 40 as shown in FIG. 8 rotates in a counterclockwise direction in order to effectively converge cut material. In one aspect, material that enters the material inlet 17 near the left-hand outer sidewall 16 is initially cut by cutting disc 42 associated with the left-hand outer cutting unit 36. The cut material is then converged due to the clockwise rotation of the converging drum arrangement and inner cutting unit 38. Stripper element 80 sweeps a path under intermediate converging drum 56 to improve the converging operation and minimize or altogether prevent cut material from wrapping on or passing beneath intermediate converging drum 56.

While, one embodiment of a stripper element 80 for a mower implement 10 has been described, a number of alternative embodiments are anticipated by the present disclosure. For example, the stripper element 80 need not have an oblong or a symmetric shape. The stripper element 80 only needs to have a shape that is effective in moving crop toward the center of the conditioner arrangement 25. Therefore, generally circular, triangular, rectangular, or other shaped stripper elements can be suitably utilized. Furthermore, the stripper element 80 in the figures has two major projections, whereas alternative embodiments of a stripper element can include more or less protrusions than two. In certain embodiments, it can be desirable to provide a stripper element with three or more protrusions to allow operation of the mowing implement 10 with a slower converging drum speed. Moreover, the protrusions or the stripper element itself could have a shape that is not flat. For example, the profile of the stripper element can be a stamped shape that matches the shape of the cutting discs to cause the crop to also be elevated as it comes into contact with the stripper element. Also, in embodiments in which a fixed stripper element is used, the shape and orientation of the stripper element and its associated projections can be configured to deflect material in a particular direction in order to aid in the crop converging operation.

In one aspect, the stripper element 80 is attached to the inner converging drum 60 with non-permanent means such as bolting, while in another aspect, the stripper element 80 is permanently affixed to, or cast as a single structure with the inner converging drum 60. In some aspects, a first stripper element 80 can be decoupled from the mower implement 10 in order to use the mower implement 10 without the stripper element 80. Alternatively, the first stripper element 80 can be exchanged for a second stripper element to accommodate a different crop or other material. For certain mowing implements, such as wide cut platforms, the stripper element is mounted to the bottom of the inner converging drum 60. However, it is to be noted that a similar stripper element 80 could be mounted for rotation with the intermediate converging drum 56, and in that location would sweep beneath the inner and outer converging drums 60 and 52. In still other embodiments, the stripper element 80 can be suspended from a portion of the mowing implement 10 independent of (i.e., not mounted to) a converging drum.

Depending on the relative size and spacing of the converging drums and cutting discs the number of converging drums used can vary. Similarly, the stripper element can be placed on a converging drum other than the inner converging drum. For example, on a platform with four converging drums on each end of the mowing implement, stripper elements can be mounted on each of the second (intermediate) and fourth (inner) converging drums relative to the side walls of the mowing implement. For platforms with only one suspended converging drum (and optionally, additional, mounted converging drums), the stripper element would be effective at the bottom of the suspended converging drum.

In another embodiment, a stripper element is mounted on the top of the converging drum, for example, to accommodate tall crop conditions. Furthermore, the stripper element can be used with equipment lacking either an auger or a conditioner arrangement. For equipment lacking an auger, the converging drum with mounted stripper element delivers crop directly to the conditioner rolls. For equipment lacking a conditioner arrangement, such as grass seed platforms, the converging drum with mounted stripper element and/or auger would deliver crop directly into the material discharge zone 23.

The stripper element 80 of the present disclosure is compatible with other components for inclusion in a mower-conditioner such as the mowing implement 10. For example, if desired, stationary stripper elements such as those described in US Pat. Publ. No. 2005/0126142 can be positioned for stripping the converging drums, while a crop transporting shelf could be mounted adjacent the bottom of the converging drums for supporting and directing crop toward the material discharge zone 23.

Figure 11:
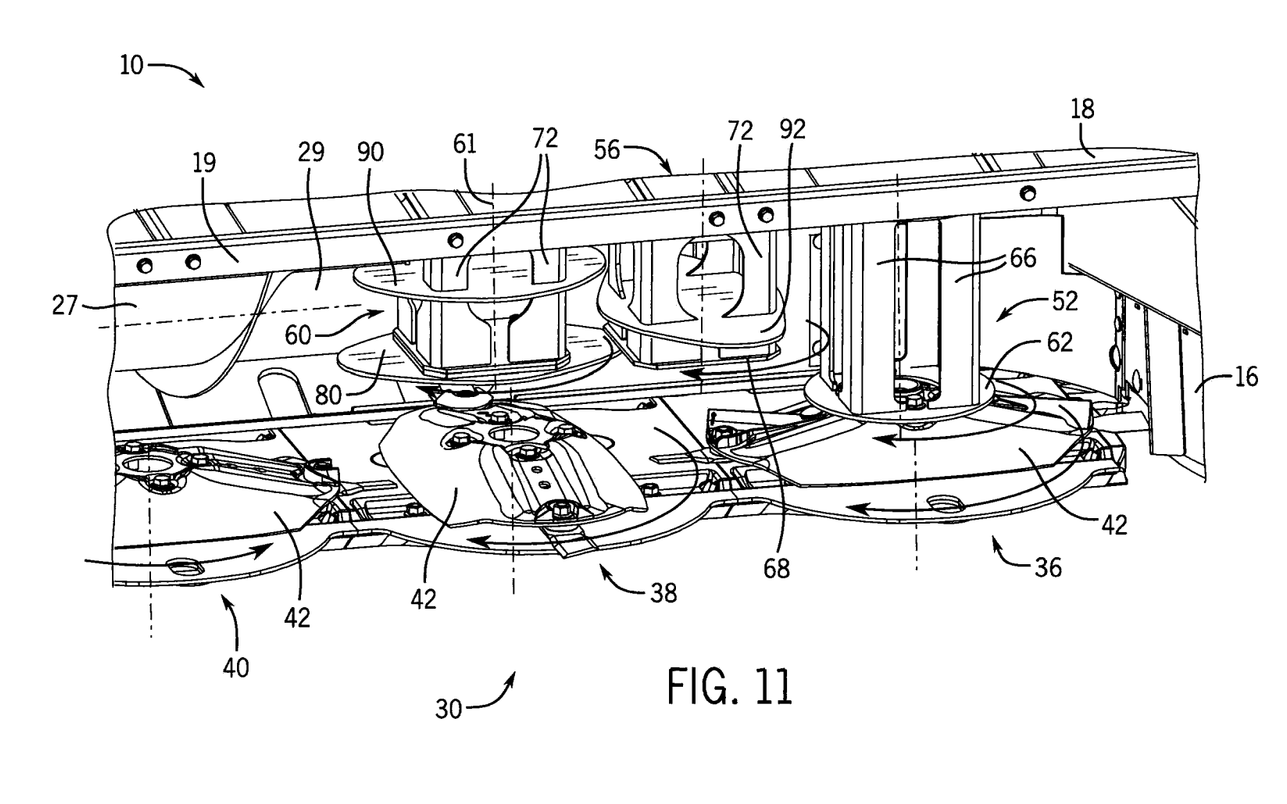
FIG. 11 is an enlarged partial front perspective view of the rotary cutter bar and converging drums of an alternate embodiment of a mower-conditioner platform having multiple stripper elements.

Turning to FIG. 11, another embodiment of a mowing implement 10 is shown in which multiple stripper elements are mounted to adjacent converging drums. As shown, the implement may have more than one stripper element on a single converging drum and/or multiple converging drums each with one or more stripper elements. The stripper elements can be positioned at the same or different elevations, and can be either the same or different size and configuration. For example, one stripper element can be positioned at an elevation relatively above a centerline of the axis of rotation of the auger, while a second stripper element can be positioned at an elevation relatively below a centerline of the axis of rotation of the auger.

In the example of FIG. 11, the stripper elements are mounted to the intermediate 56 and inner 60 converging drums. Similar to the embodiment shown in FIGS. 1-10, the intermediate 56 and inner 60 converging drums are suspended above the cutting discs 42 with a vertical gap there between. The stripper element 80 can be mounted for rotation with the inner converging drum 60 about the upright axis. The stripper element 80 is mounted at the base of the inner converging drum 60 at a vertical level such that it passes above the cutting discs 42 and below the intermediate converging drum 56. A second, smaller stripper element 90 can be mounted at an intermediate position along an upright axis of the inner converging drum 60. As shown in FIG. 11, the stripper elements 80 and 90 can be oriented such that the long axis of each of the stripper elements are vertically aligned (i.e., having the same clocking or angular orientation) when viewed along the upright axis of the inner converging drum 60. In other embodiments, the orientation of stripper element 80 can vary relative to stripper element 90, for example one being clocked 90 degrees from the other.

The intermediate converging drum 56 can mount a third stripper element 92, which can be the same size as stripper element 90, both of which are smaller than the larger stripper element 80. While the third stripper element 92 can be mounted at any location on the intermediate converging drum 56, FIG. 11 shows stripper element 92 positioned at an elevation intermediate to the elevation of the stripper elements 80 and 90. In particular stripper element 92 is positioned to sweep a path above stripper element 90 and below stripper element 90. In a manner similar to the embodiment shown in FIGS. 1-10, the stripper element 80 can be configured and arranged such that the outer periphery passes beneath the intermediate converging drum 56 and in close proximity to the outer diameter of the auger when the converging drum 60 is rotated. Stripper elements 90 and 92 can also pass in close proximity to the outer diameter of the auger when the converging drums 56 and 60 are rotated.

In operation, the stripper element 92 can be positioned to strip crop from the outer converging drum 52 and pass it to inner converging drum 60. Stripper elements 80 and 90 can cooperate to strip crop from the intermediate converging drum 56 and pass it to the auger 27. Generally, the placement of the intermediate 56 and inner 60 converging drums and the configuration of the stripper elements 80, 90 and 92 promote smooth crop flow from the outer cutting unit 36 to the auger 27 without wrapping on the intermediate and inner converging drums 56 and 60. Thus, the converging drums 52, 56 and 60 operate in conjunction with the cutting discs 42 to converge crop to the centrally positioned material discharge zone 23 where the conditioner assembly 25 is located. In other embodiments, it will be appreciated that more or less stripper elements can be mounted to one or more converging drums and that the example embodiment illustrated in FIG. 11 is not intended to be limiting.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to explain the principles of the disclosure and their practical application, and to enable others of ordinary skill in the art to understand the disclosure and recognize many alternatives, modifications, and variations on the described example(s).

For example, the general orientation of the mowing implement, and components thereof, can differ from that depicted in the figures. In particular, the figures illustrate a generally horizontally extending mower. However, the mower can instead be at an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. A mowing implement moveable in a direction of travel and operable for cutting crop and forage material above the ground, the mowing implement comprising:
   a frame defining a work area between the frame and the ground, the work area including a forwardly located material inlet and a rearwardly located material discharge zone;
   a cutter bar supported by the frame so as to extend perpendicular to the direction of travel at a location disposed between the material inlet and the material discharge zone, the cutter bar having a plurality of spaced apart knife-carrying rotary discs disposed in the work area and including a first rotary disc mounted at one end of the cutter bar, with the plurality of knife-carrying rotary discs being respectively mounted for rotation about a plurality of vertical axes;
   at least one converging drum located between the material discharge zone and the first rotary disc and being coupled to the frame and suspended above and spaced from the cutter bar and mounted for rotation about an upright axis;
   at least one stripper element mounted to, and extending transversely beyond an outer periphery of, the at least one converging drum and being spaced upwardly from the cutter bar, the at least one stripper element being mounted to rotate about the upright axis and configured to guide cut material toward the material discharge zone; and
   wherein, in addition to the at least one converging drum, there is provided a second converging drum located adjacent the at least one converging drum and between the first rotary disc and the material discharge zone, with said second converging drum being mounted to the frame and suspended above and spaced from the cutter bar; and wherein, in addition to the at least one stripper element, a second stripper is mounted to the at least one converging drum at a location spaced above said at least one stripper element; and a further stripper element being mounted to the second converging drum and having an outer periphery which rotates in a path extending between respective paths in which respective outer peripheries of the at least one and second strippers rotate.

2. The mowing implement of claim 1, wherein the at least one stripper element is a flat plate.

3. The mowing implement of claim 2, wherein the at least one stripper element defines a non-circular curved periphery.

4. The mowing implement of claim 3, wherein the at least one stripper element has intersecting major and minor axes and is symmetrically formed relative to each of the major and minor axes.

5. The mowing implement of claim 1, wherein the at least one converging drum has a bottom end facing the cutter bar, and wherein the at least one stripper element is mounted to the bottom end.

6. The mowing implement of claim 1, wherein the at least one converging drum has a top end and a bottom end facing the cutter bar, and wherein the at least one stripper element is mounted at an intermediate location between the top and bottom ends.

7. The mowing implement of claim 1, wherein the outer periphery of the at least one stripper element traces a path that extends directly beneath and overlaps the adjacent converging drum during rotation.

8. The mowing implement of claim 1, wherein the at least one stripper element and the at least one converging drum are synchronously rotated about the upright axis of rotation.

9. The mowing implement of claim 8, further comprising a rotatably mounted auger extending between the side walls of the frame, wherein a plane defined by the at least one stripper element intersects a volume defined by the auger.

10. The mowing implement of claim 9, further comprising first and second conditioner rolls supported by the frame between the cutter bar and the material discharge zone.

11. A mowing implement for cutting crop and forage material above the ground, the mowing implement comprising:
  a frame defining a work area between the frame and the ground, the work area including a forwardly located crop material inlet and a rearwardly located material discharge zone;
  a cutter bar disposed between the material inlet and the material discharge zone and supported by the frame, the cutter bar having spaced apart knife-carrying rotary discs disposed in the work area;
  a converging drum assembly mounted between the frame and the cutter bar, including:
  a first converging drum mounted to the top of an outer first one of the rotary discs for rotation with the outer first one of the rotary discs;
  a second converging drum corresponding to a relatively inner second one of the rotary discs and located laterally inward of the first converging drum by a distance approximately equal to a distance between respective axes of rotation of the outer first one and inner second one of the rotary discs, the second converging drum being rotatable about an upright axis and suspended above and spaced from the cutter bar;
  an intermediate converging drum arranged between the first and second converging drums;
  two stripper elements being mounted to the second converging drum to rotate about the upright axis and spaced upwardly from the cutter bar, the two stripper elements extending radially from the upright axis and being configured to guide cut material from the intermediate converging drum toward the material discharge zone; and
  at least one stripper element being mounted to the intermediate converging drum and being located and dimensioned for overlapping said two stripper elements mounted to the second converging drum during rotation of the intermediate converging drum.

12. The mowing implement of claim 11, wherein the two stripper elements mounted to the second converging drum each have an oblong periphery.

13. The mowing implement of claim 11, wherein in at least one angular position at least a portion of one of the two stripper elements mounted to the second converging drum is disposed beneath the intermediate converging drum and above the cutter bar.

* * * * *